(12) United States Patent
Gilbert

(10) Patent No.: US 8,145,377 B2
(45) Date of Patent: Mar. 27, 2012

(54) SUPPORT FOR PREEMPTIVE SYMPTOMS

(75) Inventor: Harry M. Gilbert, Portage, MI (US)

(73) Assignee: SPX Corporation, Charlotte, NC (US)

( * ) Notice: Subject to any disclaimer, the term of this patent is extended or adjusted under 35 U.S.C. 154(b) by 426 days.

(21) Appl. No.: 12/421,765

(22) Filed: Apr. 10, 2009

(65) Prior Publication Data

US 2010/0262332 A1    Oct. 14, 2010

(51) Int. Cl.
*G01M 17/00*    (2006.01)

(52) U.S. Cl. ........ 701/32.1; 701/33.1

(58) Field of Classification Search ......... 701/29, 701/30, 32, 33, 35; 702/184; *G01M 17/00, G01M 17/007*
See application file for complete search history.

(56) References Cited

U.S. PATENT DOCUMENTS

| | | | | |
|---|---|---|---|---|
| 6,845,468 B2 * | 1/2005 | James | .............. | 714/25 |
| 7,765,040 B2 * | 7/2010 | Underdal et al. | .............. | 701/29 |
| 7,882,394 B2 * | 2/2011 | Hosek et al. | .............. | 714/26 |
| 2007/0294001 A1 * | 12/2007 | Underdal et al. | .............. | 701/29 |
| 2008/0004764 A1 * | 1/2008 | Chinnadurai et al. | .......... | 701/29 |
| 2009/0216584 A1 * | 8/2009 | Fountain et al. | ................ | 705/7 |
| 2009/0271066 A1 * | 10/2009 | Underdal et al. | .............. | 701/35 |
| 2009/0271239 A1 * | 10/2009 | Underdal et al. | ................ | 705/8 |
| 2010/0082197 A1 * | 4/2010 | Kolbet et al. | .................. | 701/29 |
| 2010/0262431 A1 * | 10/2010 | Gilbert | ............................ | 705/2 |

* cited by examiner

*Primary Examiner* — Paul N Dickson
*Assistant Examiner* — Keith Frisby
(74) *Attorney, Agent, or Firm* — Baker & Hostetler LLP

(57) ABSTRACT

A system and method for determining work procedures through correlated symptoms are provided. The system made up of a diagnostic authoring apparatus for constructing and managing a diagnostic database. Information is stored in the diagnostic database that identifies vehicles that have the tendency to display certain symptoms in correlation with particular problems. These problems in the vehicles generally have a common solution for that type of vehicle. The problem may be common enough to check for a symptom preemptively, possibly before the vehicle owner is aware of it, or even prior to the manifestation of the symptom. The problem may warrant action taken to fix or avoid the problem. The system and method may associate and mark a problem with a preemptive symptom so a vehicle service/repair professional may be presented with the proper way to handle the associated problem for a particular vehicle.

20 Claims, 3 Drawing Sheets

SUPPORT FOR PREEMPTIVE SYMPTOMS

FIELD OF THE INVENTION

The present invention relates generally to diagnostic equipment. More particularly, the present invention relates to implementation of support in a system for notifying a user of preemptive symptoms related to potential problems for different types of diagnosed items, for example a vehicle.

BACKGROUND OF THE INVENTION

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics on a real-time basis.

A typical diagnostic system includes a display on which instructions for diagnostic procedures are displayed. The system also includes a system interface that allows the operator to view real-time operational feedback and diagnostic information. Thus, the operator may view, for example, vehicle engine speed in revolutions per minute, or battery voltage during start cranking; or a patient's heartbeat rate or blood pressure. With such a system, a relatively inexperienced operator may perform advanced diagnostic procedures and diagnose complex operational or medical problems.

It is desirable to provide a method and apparatus to identify all of the known or possible symptoms that can be associated with a failure mode or with a vehicle component for a type of test subject, and for correlating the symptoms with the corresponding failure mode or component for that type of test subject. Further, identification of a common symptom related to a specific problem can lead to greater accuracy in fixing or even avoiding the problem in like test subjects of the same type.

SUMMARY OF THE INVENTION

The foregoing needs are met, to a great extent, by the present invention, wherein in one aspect, a method and system are provided such that in some embodiments work procedures to fix a problem are determined through correlated preemptive symptoms.

In accordance with one embodiment of the present invention, a method for determining work procedures through correlated symptoms involves a diagnostic database being built, including at least symptoms, which is in communication with a diagnostic system, the diagnostic database correlates information including a symptom, a problem, a vehicle type, and a work sequence. Vehicle information for a test vehicle is entered into the diagnostic system, the vehicle information entered in the diagnostic system is matched with a vehicle type in the diagnostic database, a preemptive symptom correlated with the matched vehicle type in the diagnostic database is identified, and a user is presented with at least the preemptive symptom and the work sequence indicated for the identified preemptive symptom on a display of the diagnostic system.

In accordance with yet another embodiment of the present invention, a system for determining work procedures through correlated symptoms is made up of a diagnostic authoring apparatus for building a diagnostic database, the diagnostic database having correlated information including a symptom, a problem, a vehicle type, and a work sequence, a memory for storing the diagnostic database, and a diagnostic apparatus including an input for receiving vehicle information, a communication link for communicatively connecting with the diagnostic database, a processor for retrieving information from the diagnostic database, where the retrieved information includes at least a preemptive symptom and a work procedure, and a display for presenting a user with the information retrieved from the diagnostic database.

In accordance with still another embodiment of the present invention, a system for determining work procedures through correlated symptoms made up of a diagnostic authoring means for building a diagnostic database, the diagnostic database having correlated information including a symptom, a problem, a vehicle type, and a work sequence, a memory means for storing the diagnostic database, and a diagnostic means for receiving vehicle information, connecting with the diagnostic database, retrieving information from the diagnostic database, the information including at least a preemptive symptom and a work procedure, and presenting a user with the information retrieved from the diagnostic database.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
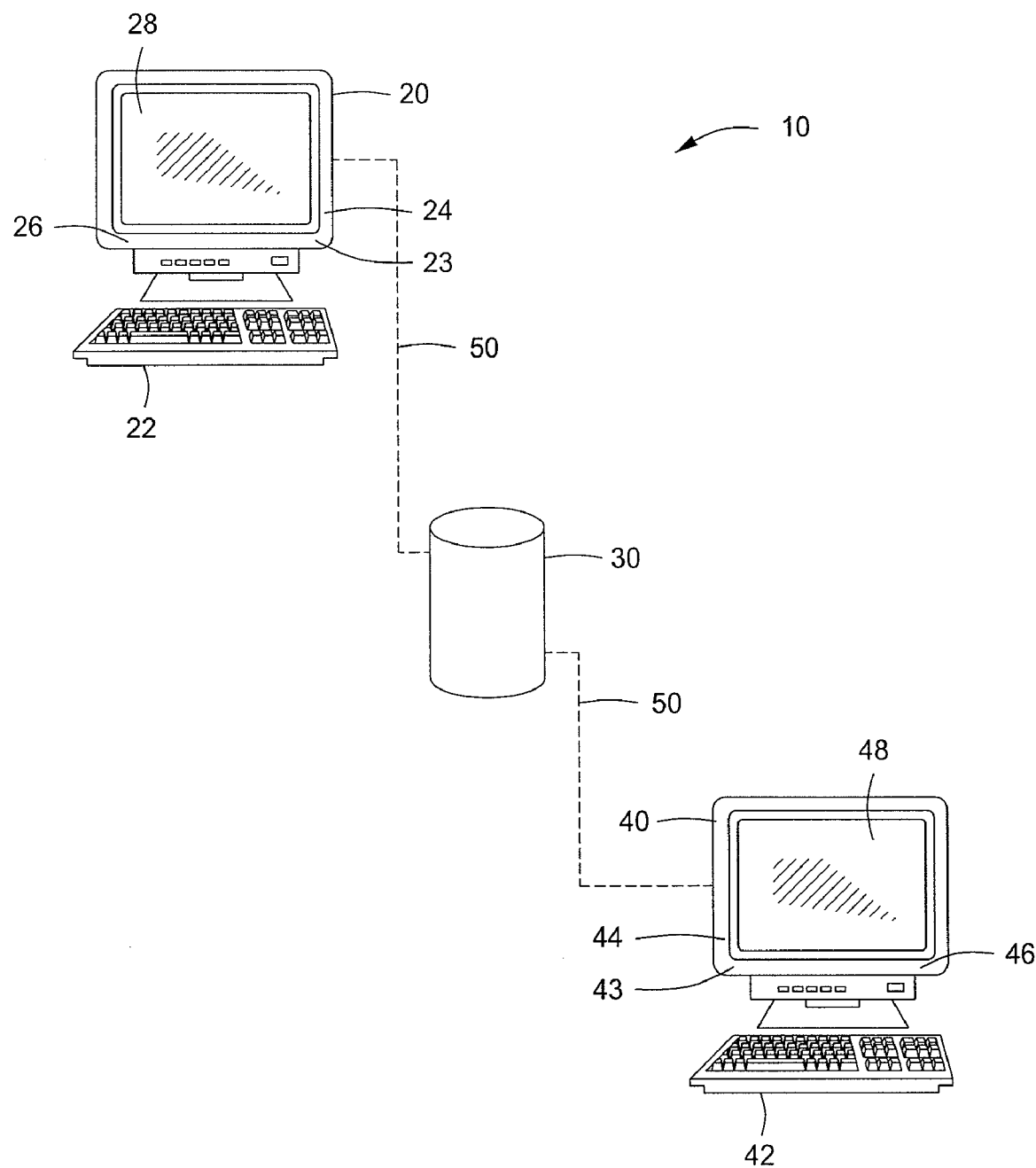
FIG. 1 is a schematic diagram illustrating a preemptive symptom system according to an embodiment of the invention.

An embodiment of the present inventive method and system for determining work procedures through correlated symptoms, can provide a database for a preemptive symptom system which correlates symptoms, problems, vehicle types, and work processes. The database can be used to determine from the symptoms, what the related problems are for, what kinds of vehicles, and what work needs to be done to resolve the problems. Symptoms may include textual descriptions of the symptoms or failure modes that represent the symptoms. The problems might be failure modes, vehicle components, or vehicle systems. The same problems can exist in more than one vehicle, so the vehicle type may be a specific vehicle or a range of vehicles. An example of a specific vehicle may be a certain year of a model made by a certain manufacturer, while a vehicle range could be a span of years for a general classification of vehicles across multiple manufacturers. The work required to fix the problem could consist of a diagnostic, repair, or service sequence.

In addition, the diagnostic database can include information that indicates a symptom to be a preemptive symptom for a particular grouping, or combination of information. The indicator can be a preemptive symptom flag to indicate that the symptom had been found in enough similar vehicles to check for the related problem when a vehicle of the proper vehicle type is brought into a center employing the preemptive symptom system. Checking for a potential problem can be initiated even without any manifestation of the symptom in the vehicle under test, or test vehicle. Running the work process related to the preemptive symptom can help solve unnoticed problems or prevent potential problems and costlier repairs.

The preemptive symptom system may further include a diagnostic authoring apparatus that is able to modify the diagnostic database. Through the diagnostic authoring apparatus, the diagnostic database may be supplied with new combinations of the information specified above to make new groupings, the existing groupings may be changed, or existing groupings may be removed. These modifications to the database many be done manually by a user or software run on the diagnostic authoring apparatus may receive information from sources outside the diagnostic authoring apparatus and automatically update the diagnostic database accordingly.

A further element of the preemptive symptom system may be a diagnostic apparatus. The diagnostic apparatus may be used with a vehicle under test. Vehicle information for the test vehicle may be entered into the diagnostic apparatus via an input. The vehicle information entered could then be compared to the information stored in the diagnostic database to see if there are any vehicle types stored matching the entered information that have a correlated preemptive symptom. If there are matching vehicle type entries with correlated preemptive symptoms, then the diagnostic apparatus can retrieve the correlated work processes and display them to the diagnostic apparatus user.

The invention will now be described with reference to the drawing figures, in which like reference numerals refer to like parts throughout. An embodiment of the present inventive system is illustrated in FIG. 1, which illustrates a preemptive symptom system 10 according to an embodiment of the invention. The preemptive symptom system 10 can correlate symptoms, problems, vehicle types, and work processes, and designate certain symptoms as preemptive symptoms. The preemptive symptoms signify existing and potential problems for related vehicle types. Through application of the preemptive symptom system 10, the existing problems can be fixed and the potential problems avoided for the related vehicle type with or without a manifestation of the preemptive symptom. The fixing and avoidance of the existing and potential problems are realized by executing the work processes related to the preemptive symptom for the vehicle type.

The preemptive symptom system 10 can include a diagnostic authoring apparatus 20, a diagnostic apparatus 40, and a diagnostic database 30. Each of the diagnostic authoring apparatus 20 and the diagnostic apparatus 40 can include an input device 22, 42, a memory 23, 43, a communication device 24, 44, a processor 26, 46, and a display 28, 48, respectively, all of which can be interconnected by a data link. The diagnostic authoring apparatus 20 and the diagnostic apparatus 40 can be a general computer, such as a personal computer (PC), a UNIX workstation, a server, a mainframe computer, a personal digital assistant (PDA), or some combination of these. Alternatively, the diagnostic authoring apparatus 20 and the diagnostic apparatus 40 can be a specialized computing device, such as a vehicle diagnostic scan tool. The remaining components can include programming code, such as source code, object code or executable code, stored on a computer-readable medium that can be loaded into the memory 23, 43 and processed by the processor 26, 46, respectively, in order to perform the desired functions of the preemptive symptom system 10.

In various embodiments, the authoring apparatus 20, diagnostic apparatus 40, and a diagnostic database 30 can be coupled to a communication network 50, which can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like. The communication network 50 allows for communication between the authoring apparatus 20, the diagnostic apparatus 40 and the diagnostic database 30.

The authoring apparatus 20 and diagnostic apparatus 40 can be coupled to the communication network 50 by way of the communication device 24, 44, respectively, which in various embodiments can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

Additionally, an embodiment of the preemptive symptom system 10 can communicate information to the user through the display 28, 48 and request user input through the input device 22, 42, respectively, by way of an interactive, menu-driven, visual display-based user interface, or graphical user interface (GUI). The user interface can be executed, for example, on a personal computer (PC) with a mouse and keyboard, with which the user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a touch screen or a voice-activated system.

In an embodiment of the present invention, the diagnostic database 30, may reside on a device separate from the authoring apparatus 20 and diagnostic apparatus 40. This device storing the diagnostic database 30 can connect to the communication network 50, allowing access to the diagnostic database 30 by the authoring apparatus 20 and diagnostic apparatus 40. Such access allows modification of and information retrieval from the diagnostic database 30.

Other embodiments of the preemptive symptom system 10 may have the diagnostic database 30 reside on the memory 23 or 43 of the authoring apparatus 20 or diagnostic apparatus 40, respectively. In either case, access to the diagnostic database 30 by the apparatus on which it does not reside can still be effected through the communications network 50.

However, it is not necessary that the authoring apparatus 20, diagnostic apparatus 40, or the diagnostic database 30 be connected to the communication network 50. If the diagnostic database 30 resides on the memory 43, then the diagnostic apparatus 40 can directly access the diagnostic database 30 on the memory 43 via the data link. The authoring apparatus 20 can still modify the diagnostic database 30 via use of physical media, such as a CD or DVD.

Figure 2:
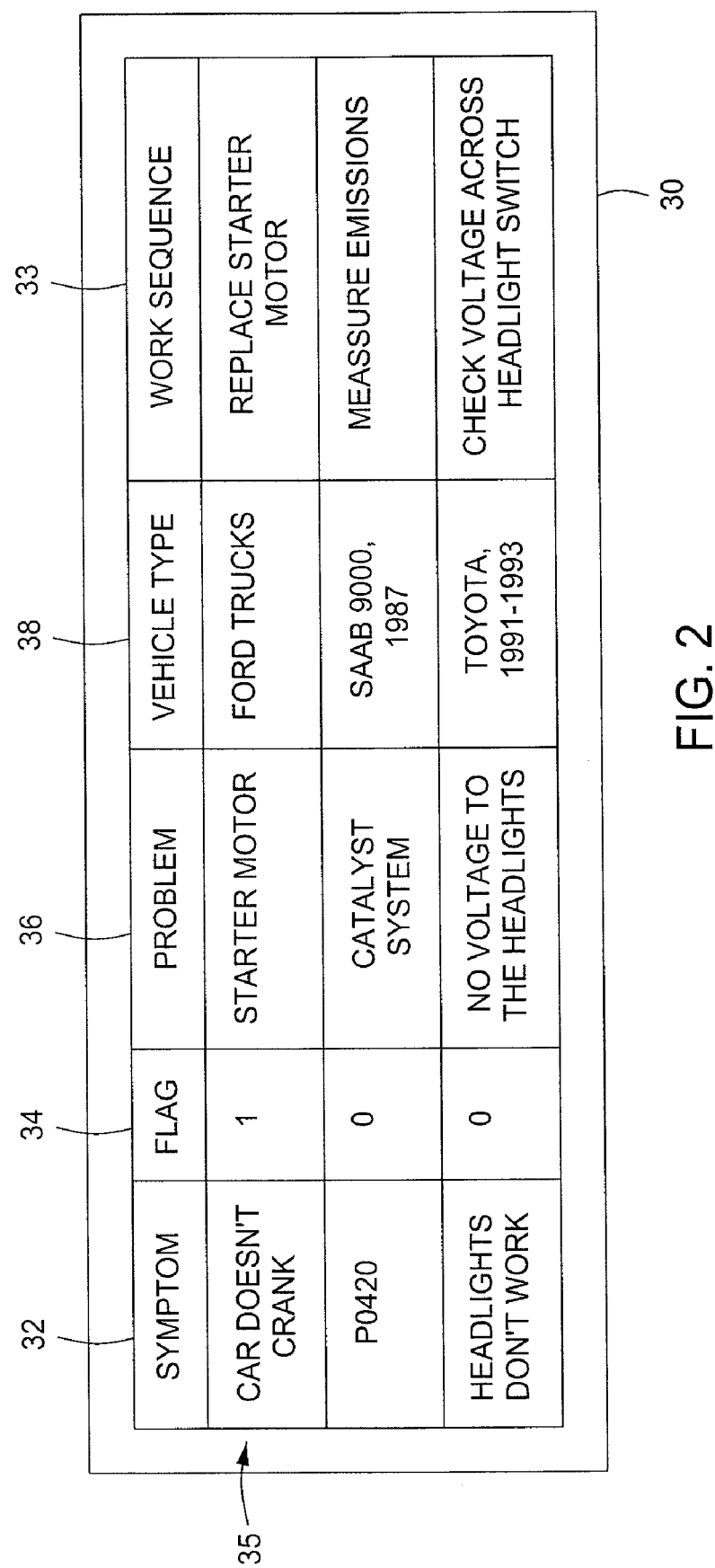
FIG. 2 is a schematic diagram of a diagnostic database according to an embodiment of the invention.

Referring now to FIG. 2, which is a schematic diagram of a diagnostic database according to an embodiment of the invention. The database 30 can be made up of a multitude of information from various sources. Some such information may include symptoms 32, work sequences 33, preemptive symptom flags 34, problems 36, and vehicle types 38. Each of these types of information can be correlated with one or multiple other types of information in the diagnostic database 30. In an embodiment of the preemptive symptom system 10, each of the above information types can be correlated to comprise a grouping 35 in the diagnostic database 30.

The symptom 32 information type represents information that could be a textual, descriptive symptom, for example "car does not crank," or it could represent a failure code.

The symptom 32 in a grouping 35 may be correlated with a particular vehicle type 38. The vehicle type 38 can manifest in a number of different incarnations, such as a single vehicle or a range of vehicles. The information making up the vehicle type can be specific to a certain vehicle make, from a certain manufacturer, made in a certain year, for example, a Saab 9000 made in 1987. The vehicle type 38 could also be a range of vehicles of varying breadth and depth. Such a range could be as broad as all Toyotas built from 1991 to 1993, or all Ford trucks. The range could also be more narrow, such as all Subaru Impreza equipped with a battery warmer. The vehicle type 38 does not have to specify a particular make, model, year, or manufacturer of a vehicle. The information in the vehicle type can be any information that would identify a vehicle, such as all vehicles equipped with Firestone tires.

Another piece of information that may be included in a grouping 35 in the diagnostic database 30, is the problem 36. The problem 36 should be a problem predetermined to be the likely cause of the symptom 32 for a vehicle type 38. The information embodying the problem 36 could be a vehicle component, such as the starter motor, a vehicle system, such as the catalyst system, or a failure mode, such as "there is no voltage to the headlights."

Further information that can be associated with a grouping 35 of the diagnostic database 30, is the work sequence 33. The work sequence 33 is what a user of the preemptive symptom system 10 would look at to determine what action should be taken in the event a preemptive symptom exists for the vehicle type 38.

The preemptive symptom flag 34, or any other indicator, can be contained within each grouping 35 containing the above described information. The setting of the preemptive symptom flag 34 can indicate whether the symptom for the corresponding grouping 35 is a preemptive symptom for the vehicle type 38 specified. The symptom 32 may be flagged for a number of reasons. An example of when the preemptive symptom flag 34 may indicate a preemptive symptom may be when the symptom 32 repeatedly indicates that there is a problem 36 with a vehicle type 38 such that it is common enough to justify running the work sequence 33 to identify or fix the problem 36, even before the problem manifests itself in a particular vehicle. The preemptive symptom flag 34 may be triggered by software that analyzes incoming data from sources reporting information on symptoms 32, problems 36, vehicle types 38, and work sequences 33, or it could be set according to a notice from a manufacturer implementing a technical service bulletin, such as a vehicle component recall.

Another segment of information that may be included in the grouping 35 in the diagnostic database 30 is priority information. Priority information may be entered for a certain grouping 35 indicating the importance of addressing a certain preemptive symptom in relation to any other issues to be resolved, or testing or fixing to be done.

The diagnostic database 30 can take the form of many different embodiments. Different database models, such as flat, relational, object, or hierarchical are a few examples of the general structures that can define the organization of the information stored.

Figure 3:
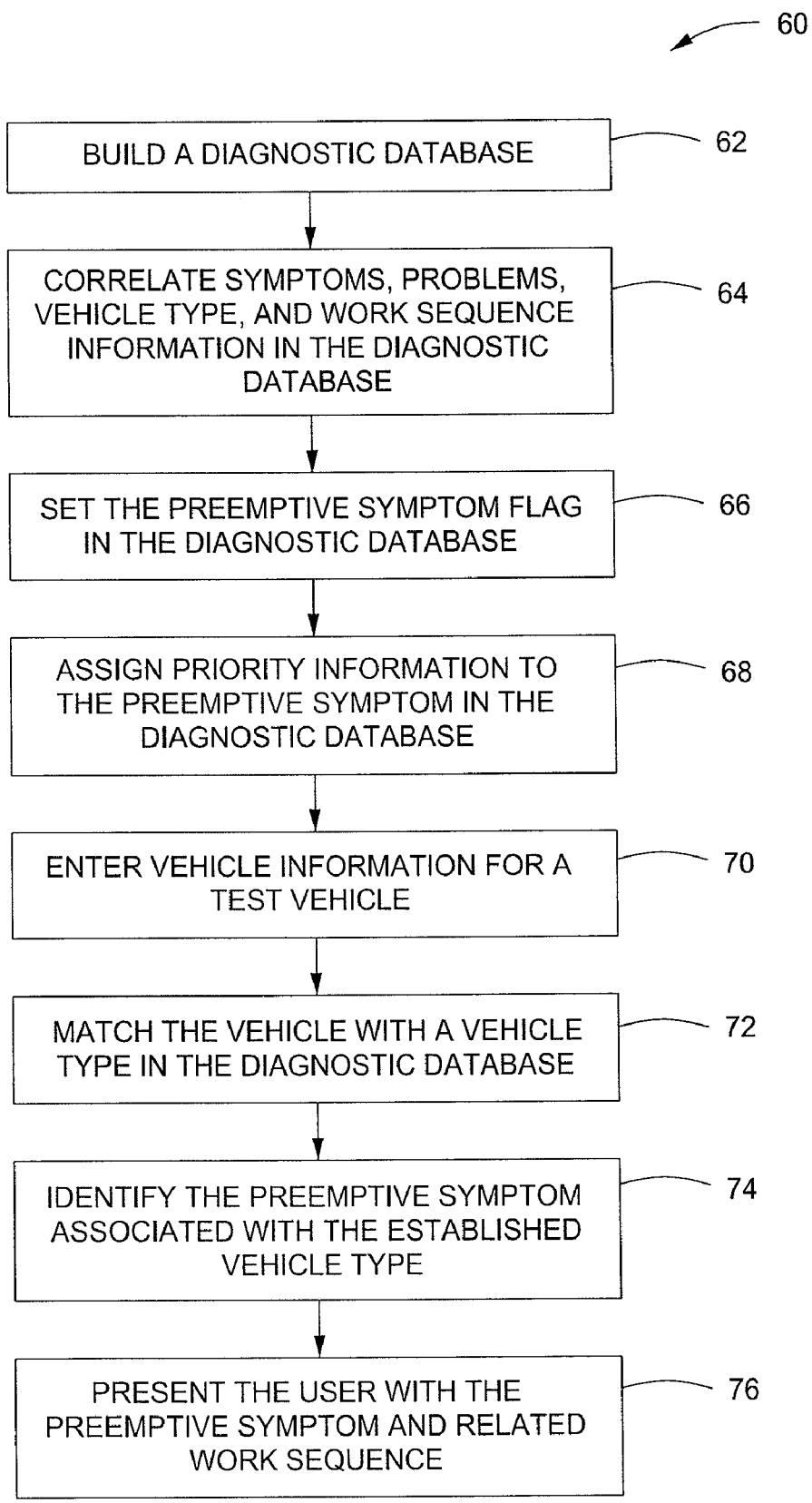
FIG. 3 is a flowchart illustrating steps that may be followed to correlate preemptive symptoms with a work sequence for a vehicle type.

Referring now to FIG. 3, a flowchart diagram depicts an embodiment of the method for determining work procedures through correlated symptoms 60. The method begins by building a diagnostic database (step 62). Building the diagnostic database will usually consist of defining the types of information to be included in the diagnostic database and how each type of information will be associated with another type of information.

However, it is not necessary that the diagnostic database be built each time the method for determining work procedures through correlated symptoms 60 is executed. Once the diagnostic database is first built, there may not be any further need to execute the step of building a diagnostic database (step 62). In other embodiments, it may not be necessary to build a diagnostic database at all, because one may already exist.

Once a diagnostic database exists, it needs to be populated with information, or if already containing information, new entries can be entered, and old entries can be modified or deleted. Information can be received from any number of sources. Some examples of sources of information may include stored historical data, manufacturers data, or data received from other devices or people that gather the information. Then the information needs to be entered into the diagnostic database so that it can be properly correlated, accessible, and useable.

When the information is entered into the diagnostic database, symptoms, problems, vehicle types, and work sequences should be correlated with each other (step 64) such that all the information can be retrieved and used in support of the preemptive symptom system. In one embodiment, the information will be correlated in a manner that allows the information related to a particular information entry to be retrieved with minimal or no extra steps.

Properly correlating the related information together is important because the diagnostic database may contain multiples of the same information of any information type. If not properly correlated, incorrect information could be retrieved and likely not be applicable in the situation where the method for determining work procedures through correlated symptoms 60 is being implemented. For example, a symptom may be repeated in the diagnostic database correlated to different vehicle types, problems, and/or work sequences. If the information is not properly correlated, the information retrieved may be the wrong problem and work sequence for the vehicle type with the particular symptom.

After the information is entered into the diagnostic database, a preemptive symptom flag can be set (step 66) to distinguish preemptive symptoms from other symptoms. In one embodiment the preemptive symptom flag may have two settings, one which indicates a symptom as a preemptive symptom, and one which indicates that the symptom is not a preemptive symptom. This preemptive symptom flag can be set to indicate a preemptive symptom when it is desired that a particular known problem for a vehicle type, should be diagnosed, tested, and/or fixed, whether or not a subject vehicle, matching the vehicle type, exhibits the preemptive symptom.

In other embodiments, the preemptive symptom flag may have multiple settings. Such settings may go beyond indicating just a positive or negative sign of a preemptive symptom. For example, there may be varying degrees of preemptive symptoms, where more common preemptive symptoms have a setting, and developing preemptive symptoms have another setting. Depending on the setting a technician may be able to determine if it is worth the time and expense to deal with the preemptive symptom.

Another step in the method for determining work procedures through correlated symptoms 60 may be assigning priority information to preemptive symptom (step 68). Priority information may be assigned if there is reason to attend to a preemptive symptom in a particular order in relation to other actions to be taken. One such example may be to test a wiring harness that is at risk of being faulty according to a preemptive symptom, prior to running a routine scan of the engine control module. This may help avoid incorrect readings from the routine scan of the engine control module and in turn prevent missing an issue or wasting time and money trying to diagnose an issue that does not exist.

With the database built and populated, a user can enter vehicle information for a test vehicle (step 70). The vehicle data entered for a test vehicle may be entered by a vehicle service professional into a diagnostic apparatus, such as a PC, scan tool, or specialized computing device, just to give a few examples. The entry of the vehicle data can be accomplished through any of a number of input devices, for example, a keyboard or keypad, pointing device, or optical scanner. The vehicle information entered is meant to identify the test vehicle such that it may be compared and matched with a vehicle type (step 72) in the diagnostic database. Vehicle identification is not the only use for the vehicle information, it may also be used to identify vehicle and environmental conditions, which may help match the test vehicle to a vehicle type, if the vehicle type is so limited, or it could be used to help determine between multiple problems and priority. For example, a certain vehicle residing in Texas may not have the same problems as a similar vehicle residing in Michigan, and therefore a preemptive symptom related to vehicle type specifying climate conditions would likely not be applicable to both vehicles.

Once a vehicle type had been established, any grouping of a vehicle type matching the test vehicle can be searched to identify an associated preemptive symptom indicator (step 74), such as a preemptive symptom flag. If the preemptive symptom indicator signals that a preemptive symptom exists for the vehicle type, then the user, which may be the same vehicle service professional that entered the vehicle information, is presented with a preemptive symptom and the associated work sequence (step 76). The user may be presented with the information from the diagnostic database in electronic form, such as on a display screen, or in a physical format, like a printout, for example.

The information returned to the user from the diagnostic database does not have to be limited to the work sequence associated with the preemptive symptom. Other embodiments of the invention may include any combination of the information in the grouping associated with the preemptive symptom in the returned information presented to the user. It is also possible, that information from other groupings in the diagnostic database be present to the user, such as information from groupings with a matching vehicle type that contain symptoms not indicated as preemptive symptoms. In some embodiments, the parameters for returning information from the diagnostic database, such as type and amount of information, may be adjusted by the user.

FIGS. 1, 2 and 3 are schematic diagrams and flowcharts of methods and systems according to various embodiments of the present invention. It will be understood that each step of the flowchart illustration, and combinations of steps in the flowchart illustration, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 1 depicts the system of one embodiment including several of the key components of a general-purpose computer by which an embodiment of the present invention may be implemented. Those of ordinary skill in the art will appreciate that a computer can include many more components than those shown in FIG. 1. However, it is not necessary that all of these generally conventional components be shown in order to disclose an illustrative embodiment for practicing the invention. The general-purpose computer can include a processing unit 26, 46, and a system memory 23, 43, which may include random access memory (RAM) and read-only memory (ROM). The computer also may include non-volatile storage memory, such as a hard disk drive, where additional data can be stored.

An embodiment of the present invention can also include one or more input devices 22, 42, such as a mouse, keyboard, and the like. A display 28, 48 can be provided for viewing text and graphical data, as well as a user interface to allow a user to request specific operations. Furthermore, an embodiment of the present invention may be connected to one or more remote computers via a communication device 24, 44. The connection may be over a communication network 50, such as a local area network (LAN) wide area network (WAN), and can include all of the necessary circuitry for such a connection.

Typically, computer program instructions, such as portions of the method for determining work procedures through correlated symptoms 60, may be loaded onto the computer or other general purpose programmable machine to produce a specialized machine, such that the instructions that execute on the computer or other programmable machine create means for implementing the functions specified in the flowchart. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the flowchart.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the flowchart steps.

Accordingly, steps of the flowchart support combinations of means for performing the specified functions, combinations of steps for performing the specified functions and program instruction means for performing the specified functions. It will also be understood that each step of the flowchart, as well as combinations of steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for determining a work sequence for a vehicle through correlated symptoms, comprising the steps of:
    storing a diagnostic database including symptoms for a particular vehicle type, the diagnostic database communicatively connected to a diagnostic apparatus;
    correlating a symptom, a problem, a vehicle type, the work sequence, and a preemptive symptom flag in the diagnostic database to create a grouping;
    flagging the grouping in the diagnostic database with the preemptive symptom flag to indicate the symptom in the grouping is a preemptive symptom and distinguishing the preemptive symptom from other symptoms;
    entering vehicle information for the vehicle into the diagnostic apparatus;
    matching the vehicle information entered in the diagnostic apparatus with the vehicle type in the diagnostic database;
    identifying the preemptive symptom correlated with the matched vehicle type in the diagnostic database; and
    presenting a user with the preemptive symptom and the work sequence indicated for the identified preemptive symptom on a display of the diagnostic apparatus.

2. The method of claim 1, wherein identifying the preemptive symptom further comprises the step of checking the grouping for the preemptive symptom flag.

3. The method of claim 1, further comprising the step of assigning priority information to the grouping containing the preemptive symptom indicating relative importance in comparison to other work sequences for the vehicle.

4. The method of claim 1, further comprising the step of updating the diagnostic database when additional symptoms are found for the vehicle type.

5. The method of claim 1, wherein presenting the user with the preemptive symptom and the work sequence occurs even though the preemptive symptom is not currently present in the vehicle.

6. The method of claim 1, further comprising the step of adding new groupings to the diagnostic database.

7. The method of claim 1, further comprising the step of manually updating the diagnostic database and adding new groupings to the diagnostic database.

8. The method of claim 1, further comprising the step of automatically updating the diagnostic database and adding new groupings to the diagnostic database.

9. A diagnostic apparatus that determines work procedures for a vehicle through correlated symptoms, comprising:
    a memory configured to store a diagnostic database, the diagnostic database having correlated in a grouping of information a symptom, a problem, a vehicle type, the work procedure, and a preemptive symptom flag configured to indicate whether the symptom is a preemptive symptom;
    an input configured to receive vehicle information;
    a processor configured to match the vehicle information entered into the diagnostic apparatus with the vehicle type in the diagnostic database, identify the preemptive symptom correlated with the matched vehicle type in the diagnostic database, and retrieve information from the diagnostic database, the information including the preemptive symptom and the work procedure; and
    a display configured to present a user with the information retrieved from the diagnostic database.

10. The apparatus of claim 9, wherein the problem includes a vehicle component, system, or failure mode.

11. The apparatus of claim 9, wherein the symptom includes a textual description of the symptom or a failure code.

12. The apparatus of claim 9, wherein the vehicle type includes a single vehicle or a range of vehicles.

13. The apparatus of claim 9, wherein the work procedure includes a diagnostic, repair, or service sequence.

14. The apparatus of claim 9, wherein the vehicle information includes a vehicle identification information, a vehicle condition information, or an environmental condition information.

15. The apparatus of claim 9, wherein the grouping of information further comprises priority information correlated to the preemptive symptom.

16. A diagnostic tool for determining a work sequence through correlated symptoms, comprising:
    means for storing a diagnostic database, the diagnostic database having correlated in a grouping a symptom, a problem, a vehicle type, the work sequence, and a preemptive symptom flag configured to indicate whether the symptom is a preemptive symptom;
    means for inputting vehicle information;
    means for processing that matches the vehicle information entered into the diagnostic tool with the vehicle type in the diagnostic database, identifies the preemptive symptom correlated with the matched vehicle type in the diagnostic database, and retrieves information from the diagnostic database, the information including the preemptive symptom and the work sequence; and means for displaying to a user the information retrieved from the diagnostic database.

17. The diagnostic means of claim 16, wherein the grouping further comprises priority information correlated to the grouping containing the preemptive symptom.

18. A diagnostic authoring apparatus to determine work procedures for a vehicle through correlated symptoms, comprising:
 a diagnostic database built by the authoring apparatus, the diagnostic database having correlated in a grouping of information a symptom, a problem, a vehicle type, the work procedure sequence, and a preemptive symptom flag configured to indicate whether the symptom is a preemptive symptom;
 an input configured to receive the information for the diagnostic database;
 a processor configured to transfer the information from the input to the diagnostic database; and
 a memory configured to store the diagnostic database.

19. The apparatus of claim 18, wherein the processor is configured to run software stored on the memory and to automatically update the diagnostic database upon receiving new information.

20. The apparatus of claim 18, wherein the grouping further comprises priority information correlated to the preemptive symptom.

* * * * *